United States Patent
Östman et al.

[11] Patent Number: 6,061,704
[45] Date of Patent: May 9, 2000

[54] METHOD AND APPARATUS FOR RATE CONVERSION

[75] Inventors: Thomas Östman, Spånga; Anders Järleholm; Dan Lindqvist, both of Sollentuna, all of Sweden

[73] Assignee: Telefonaktiebolaget LM Ericsson, Stockholm, Sweden

[21] Appl. No.: 08/996,626

[22] Filed: Dec. 23, 1997

[51] Int. Cl.[7] .............................. G06F 17/17; H03M 7/00
[52] U.S. Cl. ............................................. 708/313; 341/61
[58] Field of Search .............................. 708/313; 341/61, 341/123

[56] References Cited

U.S. PATENT DOCUMENTS

| | | | |
|---|---|---|---|
| 4,707,841 | 11/1987 | Yen et al. | |
| 4,797,845 | 1/1989 | Stikvoort | |
| 5,227,787 | 7/1993 | Kurashina | 341/61 |
| 5,461,604 | 10/1995 | Hasegawa | 708/313 |
| 5,497,152 | 3/1996 | Wilson et al. | 708/313 |

FOREIGN PATENT DOCUMENTS

| | | |
|---|---|---|
| 0 599 817 A1 | 6/1994 | European Pat. Off. |
| 0 837 561 A2 | 4/1998 | European Pat. Off. |

*Primary Examiner*—Tan V. Mai
*Attorney, Agent, or Firm*—Jenkens & Gilchrist, P.C.

[57] ABSTRACT

A method and apparatus in a radio telecommunications system for converting data from a first sample rate to a second sample rate such that the first and second sample rates are preferably within 10% of each other are disclosed. An input buffer receives a plurality of data groupings at a first sample rate. A spline filter utilizes the input data along with a phase difference between input and output data to calculate a third order spline function and an output time for the input data. This information is used to convert the input data at the first sample rate to output data at a second sample rate. The output data is buffered within an output buffer until transmitted to an associated base band unit.

14 Claims, 4 Drawing Sheets

METHOD AND APPARATUS FOR RATE CONVERSION

BACKGROUND OF THE INVENTION

1. Technical Field of the Invention

The present invention relates to rate conversion, and more particularly, to a rate conversion within radio telecommunication's equipment that does not require a common divider.

2. Description of Related Art

The expansion of cellular telephone communications technologies has provided a boon in the ability of the public to communicate using wireless services. However, the development of wireless technologies have resulted in different standards of services being available for users. Thus, the situation may arise where a single wideband receiver may be required to operate with different types of systems. There are several system types available that provide mobile communication services to users. Some major ones are the Advanced Mobile Phone Service (AMPS), which is an analog wireless communication standard; the Digital Advanced Mobile Phone Service (D-AMPS), which is a digital cellular communication standard; and the Global System for Mobile Communication (GSM), which is another digital standard.

During operations of a cellular telephone network, it is possible that a single wideband receiver may be required to operate with both a AMPS/D-AMPS base station and a GSM base station. When a wideband receiver sends information to base band units using different standards, a problem arises from the differing clock frequencies defined by each standard. In order to find commonality between the different systems, a very high common divider (if available) must be determined. For example, within an AMPS/D-AMPS base station, the first usable common frequency is 19.44 MHZ. For a GSM system, the frequency used used is 13 MHZ. The first available common divider for all of these standards is 6.318 GHz (13×486=19.44×325). This high common divider makes it very difficult to perform rate conversions with the help of known interpolating/decimation filters which do not operate at this high frequency level. Thus, some improved method for performing rate conversions between differing systems would be greatly beneficial to the wireless communications industry.

SUMMARY OF THE INVENTION

The present invention overcomes the foregoing and other problem with a rate converter for converting data at a first sample rate to data at a second sample rate. Received data at a first sample rate is placed within an input buffer where successive groupings of data are stored until needed for processing. A filter capable of computing intermediate values between input samples is connected with the input buffer and utilizes groupings of the received input data stored within the input buffer along with the phase value difference between the input data and the output data to convert data at the first sample rate into an output group of data at the second sample rate. The sample rates of the first and second groups of data are preferably within 10% of each other (though this is not a hard requirement). The generated output data is stored within an output buffer until transmitted to an associated base band unit.

The groups of input data within the input buffer are utilized to compute a third order spline function for a selected group of input data. The spline function enables the computation of intermediate values between the input samples. Additionally, an output time for the selected group of input data is also calculated using the input time for the received group of data, the ratio of the received sample rate to the output sample rate, the sample rate of the output data and the phase difference between the input and output signals. The value of the output data at the second sample rate is generated from the determined output time and the spline function. The phase difference between the received and output data is calculated with a virtual phase-lock-loop utilizing the ratios of the functions of the input and output sample rates.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
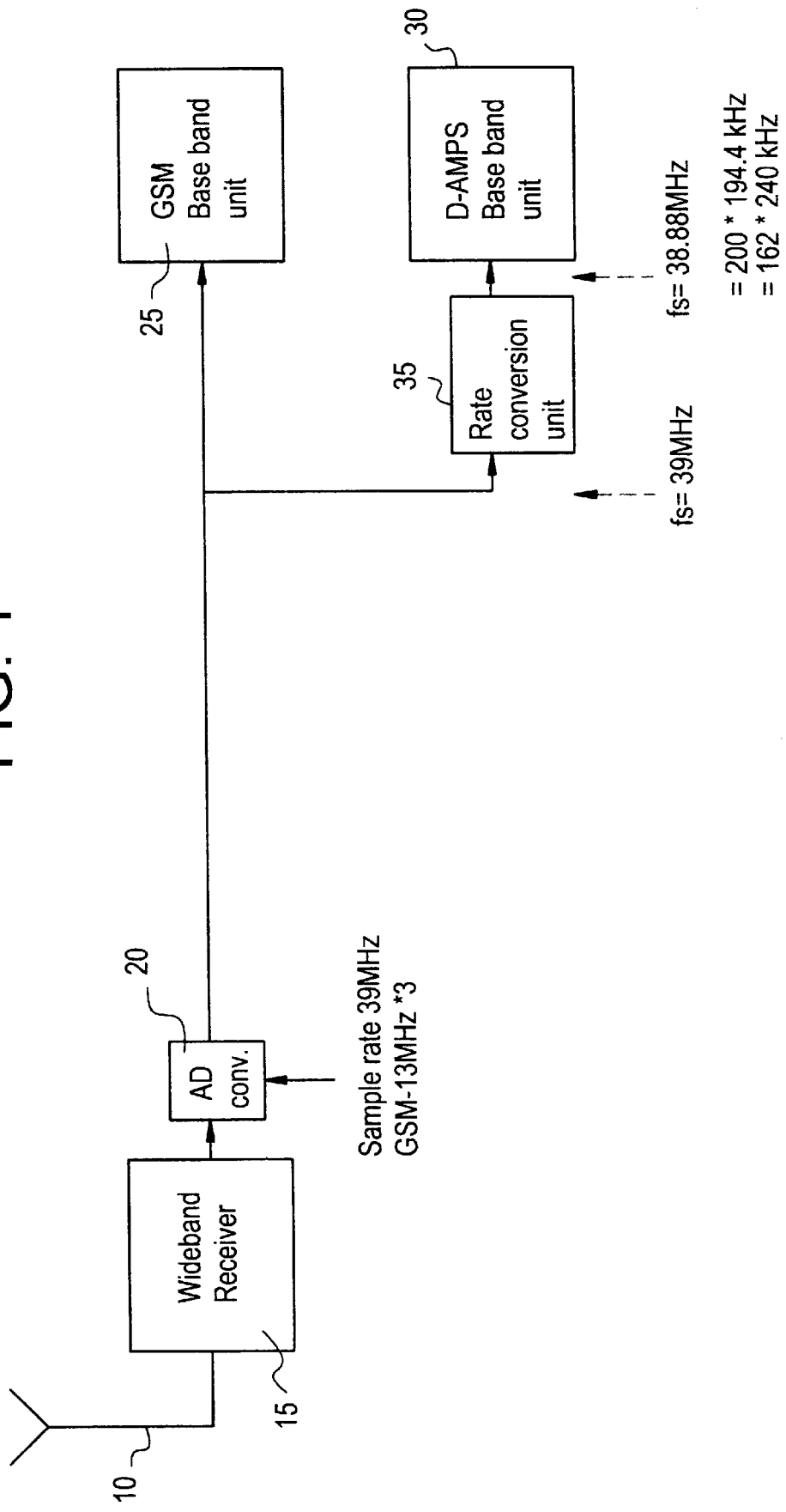
FIG. 1 is a block diagram of an implementation of the rate converter of the present invention within a cellular communications network including a number of differing baseband unit standards.

Referring now to Drawings, and more particularly to FIG. 1, there is illustrated an application of the rate conversion unit of the present invention. A signal transmitted from a mobile unit (not shown) is received at an antenna 10 of a wideband receiver 15. The received signal comprises an analog signal which is processed by an A/D converter 20 having a sampling rate of 39 MHZ. The sampling rate of 39 MHZ is chosen as a rate because it comprises a common divider of the 13 MHZ clock rate of a GSM system and is close to the 38.88 common divider of the 19.44 MHZ AMPS/D-AMPS system. The signal from the A/D converter 20 at a 39 MHZ sampling rate is input to a GSM base band unit 25 and a D-AMPS base band unit 30 through a rate conversion unit 35. The rate conversion unit 35 converts the 39 MHZ sampling rate necessary for operating with a GSM base band unit 25 to a 38.88 MHZ sampling rate operable with a D-AMPS base band unit.

According to the present invention, a high common divider that exactly satisfies the clock rates for two separate systems is not selected. Instead, a common divider frequency which is equal to or very near a multiple of the sample (clock) rates of the systems being converted is selected. The 39 MHZ frequency comprises exactly three-times the 13 MHZ GSM clock rate and is very close to 38.88 MHZ corresponding to twice the 19.44 AMPS/D-AMPS clock rate. There is only a 3% difference between the 38.88 MHZ (2×19.44) and 39 MHZ (3×13) clock rates. According to the present invention, the selected frequency preferably has a difference less than 10% from a frequency multiple of the clock rates of the associated systems. However, differences greater than 10% may also be utilized.

Figure 2:
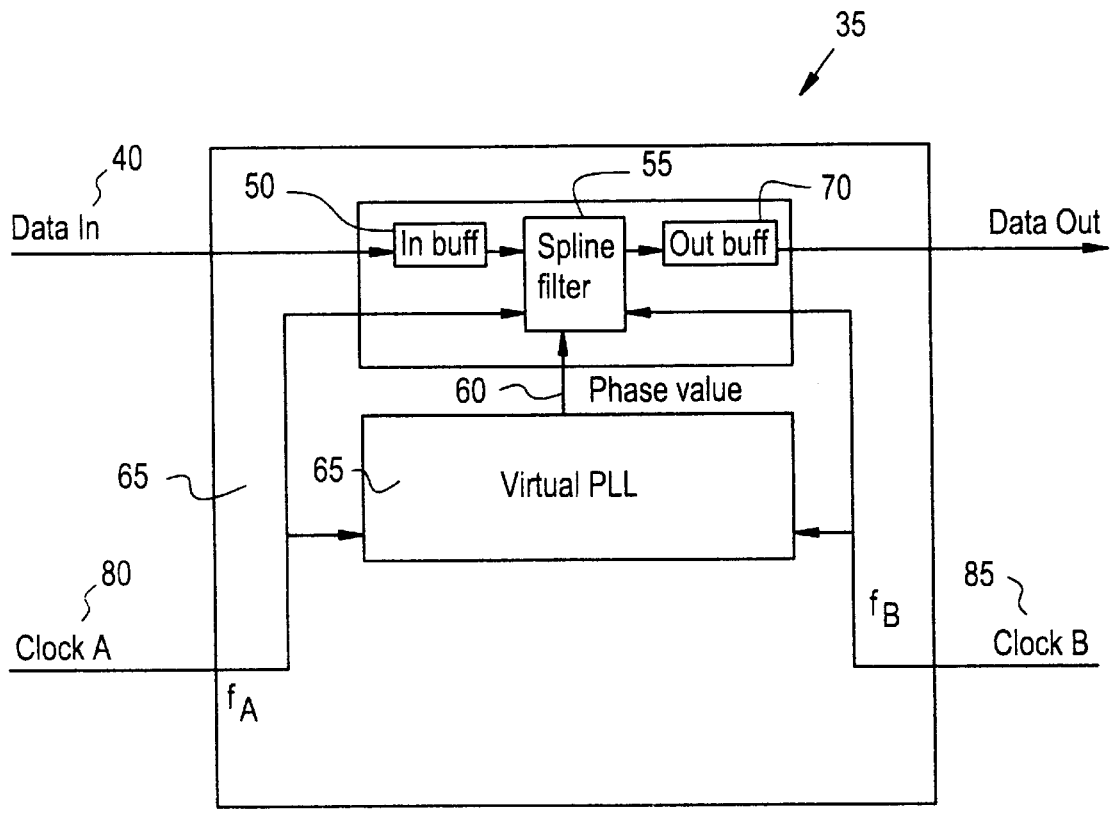
FIG. 2 is a block diagram of the rate converter of the present invention.

Referring now to FIG. 2, there is illustrated the rate converter 35 of the present invention. While the example in FIG. 1 illustrates the conversion of a 39 MHZ sample rate to a 38.88 MHZ sample rate, it should be realized that the rate converter 35 of the present invention is operable to convert between any two sample rates in accordance with the description provided below. The input data 40 is received at an input buffer 50 where the data is held until it is needed for processing by a spline filter 55. The spline filter is used to generate a third order spline function. While the present embodiment is discussed with respect to a spline filter other types of interpolating filters may be used. The spline filter 55 utilizes the input data 40 and a phase value 60 from a virtual phase lock loop (PLL) 65 to calculate output data at the converted sample rate. The converted output data is stored in an output buffer 70 before it is forwarded to an associated base band unit 30. In addition to the input data sample 40, the rate converter 35 receives the sample rate from a first system (sample rate A 80) and a second system (sample rate B 85). Each of these sample rates are also input to the spline filter 55, virtual phase lock loop 65 and phase accumulators 130a, 140d to enable processing by the rate converter 35.

The virtual phase lock loop 65 calculates the phase value 60 in response to k1 and k2 ratios. The ratios are defined by:

$$k1=(fA-fB)/fA=(1/t_A-1/t_B)t_A=(1-t_A/t_B)$$

$$k2=(fA-fB)/fB=(1/t_A-1/t_B)t_B=(1-t_B/t_A)$$

where: $fA=1/t_A$;
$fB=1/t_B$;
fA is the sample rate of input data; and
fB is the sample rate of output data.

Figure 3:
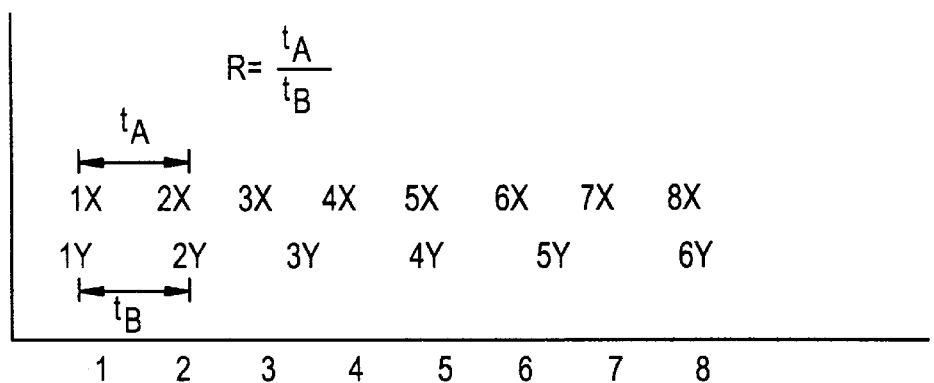
FIG. 3 is an illustration of inputs and outputs of a spline filter.
Figure 4:
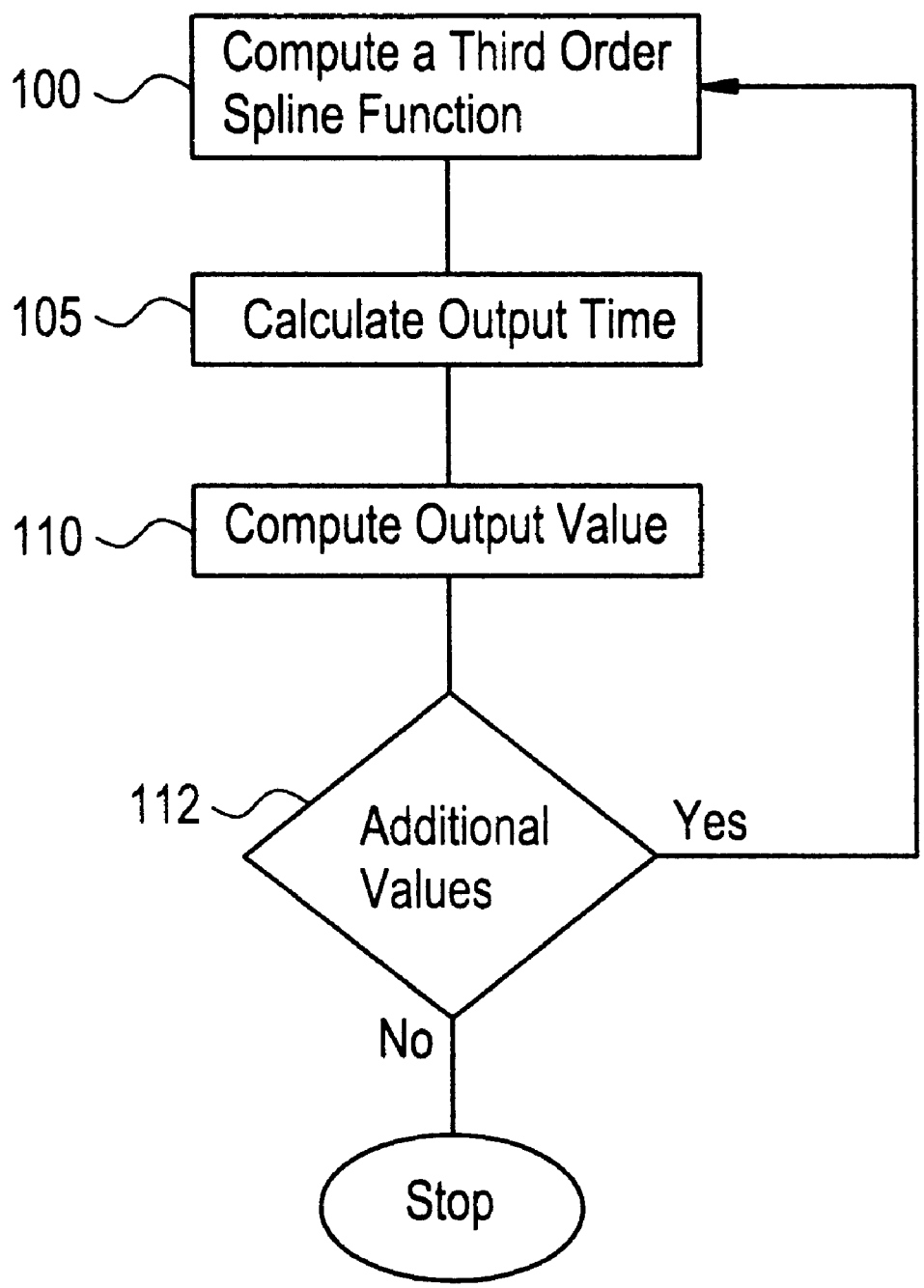
FIG. 4 is a flow diagram of the method for determining the output values of the spline filter of FIG. 2.

Referring now to FIGS. 3 and 4, there is illustrated the method for generating output data at the new sample rate from input data 40 at the first sample rate and the sample rates of the input data system and the output data system. FIG. 3 illustrates a number of inputs and outputs at various times T. The X's represent input samples to the rate converter 35 while Y's represent output samples of the rate converter. For the following calculations, the following variables will also be used: $t_A$=the time between 1X and 2X; $t_B$=the time between 1Y and 2Y; $R=t_A/t_B$ (conversion ratio). It is assumed that the conversion ratio R is known for the rate converter 35. The conversion ratio must be known with the same or higher accuracy than the resolution of the input data samples 40. The rate conversion process initially assumes that the input at 1X and the output at 1Y occur at exactly the same time (i.e., Δt is zero, wherein Δt=the time difference between an input value and a corresponding output value at the new sample rate).

Referring now also to FIG. 4, the process performed by the spline filter 55 is illustrated. A third order spline function is computed at step 100 for output 3Y from the input data 40 at times 2X, 3X, 4X and 5X. Next, at step 105, the output time for sample 3Y may be calculated according to the equation:

$$t_{3Y}=t_{3X}+2(1-R)t_B+\Delta t.$$

or more generally:

$$t_{nY}=t_{nX}+(n-1)(1-R)t_B+\Delta t.$$

The output value at the new sample rate for 3Y, is computed at step 110 from the third order spline function determined at step 100 and the time for sample 3Y calculated at step 105. If inquiry step 112 determines additional values exist to be converted, processing returns to step 100 to determine the value for the next output sample by repeating the steps described above.

In the present example, the value for the next output sample 4Y would be determined by determining the third order spline function from input values 3X, 4X, 5X, and 6X and the time 4Y determined from the equation:

$$t_{4Y}=t_{4X}+3(1-R)t_B+\Delta t.$$

This procedure would continue in this manner until all output sample values were determined. Sometimes, no Y values will exist between X values.

Now that the problem of interpolating each of the output sample values has been solved, the only remaining problem arises from the phase relationships between the input samples X and the output samples Y. The initial assumption is that the Δt between 1X and 1Y sample equals zero. The phase relationships between the X samples and the Y samples may be resolved using the virtual phase lock loop (PLL) 65.

Figure 2A:
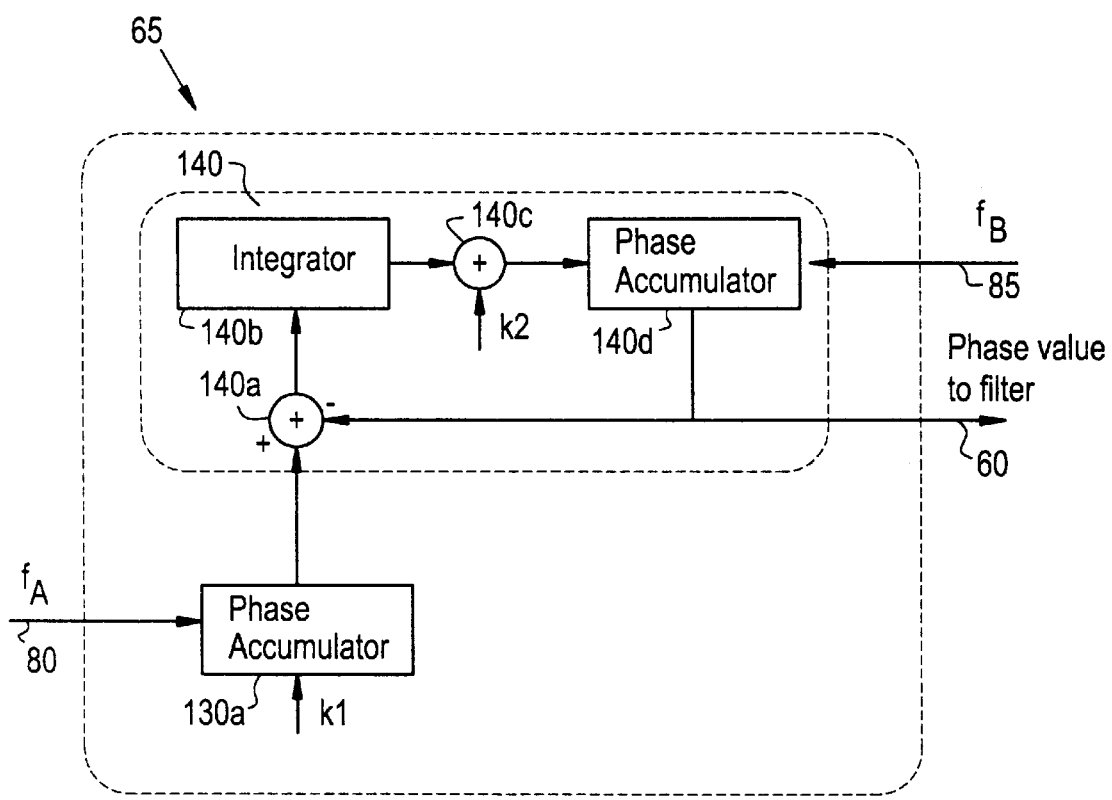
FIG. 2A is a block diagram of a virtual phase lock loop.

FIG. 2A more fully illustrates the PLL 65. The phase difference between fA and fB are estimated using two phase accumulators 130a and 140d, both generating an output signal with the frequency difference between fA and fB. The phase difference is detected with adder 140a. To avoid performance degradation due to jitter, the phase difference is filtered with a PLL 140. The PLL 140 consist of an adder 140a acting as phase detector, and an integrator 140b acting as PLL low pass filter. Depending on performance requirements, different types of low-pass filters may be used. The oscillator part of the PLL 140 consists of an adder 140c and a phase accumulator 140d. The nominal output frequency from the phase accumulators 130a and 140d is set by the values of k1 and k2 where:

$$k1=(fA-fB)/fA$$

$$k2=(fA-fB)/fB$$

The output phase values 60 are supplied to the spline filter 55.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for converting data from a first sample rate to a second sample rate, comprising the steps of:
  receiving a plurality of groups of input data at a first sample rate;
  computing a third order interpolation function for a selected input group of data;
  determining an output time for the selected input group of data;
  determining a phase difference between the selected input group of data and an output group of data from a function of the first sample rate and the second sample rate; and
  generating an output group of data at the second sample rate from the determined output time and the third order spline functions for the selected input group of data.

2. The method of claim 1, further including the step of:
  buffering the received plurality of groups of input data.

3. The method of claim 1, wherein the step of computing further comprises the step of:

computing the third order interpolation function from a first input group of data received immediately before the selected input group of data and second and third groups of input data received after the selected input group of data.

4. The method of claim 1, wherein the step of determining an output time further comprises the step of:

determining the output time for the selected input group of data according to the equation:

$$t_{nY}=t_{nX}+(n-1)(1-R)t_B+\Delta t$$

where:
n=the number of the selected input sample data;
R sample rate ratio; and
$t_B$=output data clock period.

5. The method of claim 1, wherein the phase difference is calculated according to the equations:

$$k1=(fA-fB)/fA$$

$$k2=(fA-fB)/fB$$

where:
fA=sample rate of input data
fB=sample rate of output data.

6. A rate converter comprising:
an input buffer for receiving and holding groups of data at a first sample rate;
a interpolation filter for computing a third order spline function in response to groups of input data, determining an output time for a selected input group of data, and converting the selected input group of data at a first sample rate to an output group of data at a second sample rate from the determined output time and the third order spline function; and
an output buffer for storing the converted output group of data at the second sample rate.

7. The rate converter of claim 6, wherein the first sample rate and the second sample rate are within approximately 10% of each other.

8. The rate converter of claim 6, further including a phase-locked-loop for determining a phase difference between the selected input group of data and the output group of data using a function of the first sample rate and the second sample rate.

9. The method of claim 8, wherein the phase difference is calculated according to the equations:

$$k1=(fA-fB)/fA$$

$$k2=(fA-fB)/fB$$

where:
fA=sample rate of input data
fB=sample rate of output data.

10. The rate converter of claim 7, wherein the interpolation filter further computes the third order spline function from a first input group of data received before the selected input group of data and second and third groups of input data received after the selected input group of data.

11. The rate converter of claim 7, wherein the spline function further computes the output time by determining the output time for the selected input group of data according to the equation:

$$t_{nY}=t_{nX}+(n-1)(1-R)t_B+\Delta t$$

where:
n=the number of the selected input sample data;
R=sample rate ratio; and
$t_B$=output data clock period.

12. A method for converting data from a first sample rate to a second sample rate, comprising the steps of:

receiving a plurality of groups of input data at a first sample rate;

computing a third order interpolation function for a selected input group of data;

determining the output time for the selected input group of data according to the equation:

$$t_{nY}=t_{nX}+(n-1)(1-R)t_B+\Delta t$$

where:
n=the number of the selected input sample data;
R=sample rate ratio; and
$t_B$=output data clock period; and generating an output group of data at the second sample rate from the determined output time and the third order spline functions for the selected input group of data.

13. The method of claim 12, further including the step of determining a phase difference between the selected input group of data and the output group of data from a function of the first sample rate and the second sample rate.

14. The method of claim 13, wherein the phase difference is calculated according to the equations:

$$k1=(fA-fB)/fA$$

$$k2=(fA-fB)/fB$$

where:
fA=sample rate of input data
fB=sample rate of output data.

* * * * *

UNITED STATES PATENT AND TRADEMARK OFFICE
CERTIFICATE OF CORRECTION

PATENT NO.    : 6,061,704
DATED         : May 9, 2000
INVENTOR(S)   : Östman et al.

It is certified that error appears in the above-identified patent and that said Letters Patent is hereby corrected as shown below:

Column 6,
Line 4, replace "7" with -- 6 --
Line 9, replace "7" with -- 6 --

Signed and Sealed this

Twenty-fifth Day of September, 2001

*Attest:*

*Attesting Officer*

NICHOLAS P. GODICI
*Acting Director of the United States Patent and Trademark Office*